US012691524B2

(12) United States Patent (10) Patent No.: US 12,691,524 B2

Yu et al. (45) Date of Patent: Jul. 28, 2026

(54) AUTOMATIC MODULE SWITCHING SYSTEM OF A COMBINED PROCESSING APPARATUS

(71) Applicant: FLUX TECHNOLOGY INC., Taoyuan City (TW)

(72) Inventors: Chun-Jen Yu, Taipei City (TW); Shang-Yun Hsu, Taipei City (TW)

(73) Assignee: Flux Technology Inc., Taoyuan City (TW)

( * ) Notice: Subject to any disclaimer, the term of this patent is extended or adjusted under 35 U.S.C. 154(b) by 916 days.

(21) Appl. No.: 18/058,846

(22) Filed: Nov. 25, 2022

(65) Prior Publication Data

US 2024/0173798 A1     May 30, 2024

(51) Int. Cl.
B23K 26/08          (2014.01)

(52) U.S. Cl.
CPC ................................. *B23K 26/0869* (2013.01)

(58) Field of Classification Search
CPC ............ B23K 26/0869; B23K 26/0876; B23K 26/362; B23K 7/10; B44C 1/228
USPC ...................................................... 219/121.67
See application file for complete search history.

(56) References Cited

U.S. PATENT DOCUMENTS 3,761,675 A * 9/1973 Mason ........................ B26F 3/16
                                              700/134
4,039,799 A * 8/1977 Stumpf ................. B23K 26/702
                                              219/121.84

4,354,196 A * 10/1982 Neumann ............ B23K 26/082
                                              347/256
4,672,172 A * 6/1987 Pearl ..................... B23K 26/702
                                              198/816
4,908,493 A * 3/1990 Susemihl ........... B23K 26/0665
                                              219/121.72
4,985,780 A * 1/1991 Garnier .................. B23K 26/10
                                              219/121.68
5,051,558 A * 9/1991 Sukhman ............. B23K 26/128
                                              219/121.75
5,089,683 A * 2/1992 Stephenson .......... B23K 26/064
                                              219/121.78

(Continued)

FOREIGN PATENT DOCUMENTS

JP          H04104271 U * 9/1992 ............... B23K 7/10
JP          2014140850 A * 8/2014 ......... B23K 26/0884
WO       WO-2010125928 A1 * 11/2010 ............. B23K 37/02

*Primary Examiner* — Jimmy Chou
(74) *Attorney, Agent, or Firm* — Rosenberg, Klein & Lee

(57)                    ABSTRACT

An automatic module switching system of a combined processing apparatus includes a chassis, a moving mechanism, a holding device, and multiple processing modules. The moving mechanism is driven to drive the holding device to move along a first moving direction and the holding device is driven to move along a second moving direction on the moving mechanism. The processing modules are detachably mounted onto the positioning sets of the hanging wall of the chassis and the holding device. The holding device drives the processing module thereon to move along a third moving direction. The combined processing apparatus can be scheduled to switch the processing modules automatically according user's needs, such that the combined processing apparatus can process in a manner that meets the user's needs. Cost for purchasing the plurality of processing machines can be saved and the problem of occupying much room can be also avoided.

10 Claims, 8 Drawing Sheets

(56) References Cited

U.S. PATENT DOCUMENTS

| | | | | |
|---|---|---|---|---|
| 5,183,993 A * | 2/1993 | Sato | B23K 26/0838 | 219/121.78 |
| 5,262,612 A * | 11/1993 | Momany | B23K 26/0344 | 700/166 |
| 5,262,613 A * | 11/1993 | Norris | B23K 26/10 | 219/121.68 |
| 5,327,167 A * | 7/1994 | Pollard | H04N 1/4058 | 219/121.68 |
| 5,341,157 A * | 8/1994 | Campagna | G05B 19/4099 | 347/264 |
| 5,386,097 A * | 1/1995 | Ruckl | B41C 1/145 | 219/121.68 |
| 5,416,298 A * | 5/1995 | Robert | B23K 26/067 | 219/121.75 |
| 5,560,843 A * | 10/1996 | Koike | B23K 26/0892 | 219/121.48 |
| 5,662,821 A * | 9/1997 | Ruckl | H04N 1/06 | 219/121.72 |
| 5,672,285 A * | 9/1997 | Kondo | B23K 26/0648 | 219/121.73 |
| 5,868,056 A * | 2/1999 | Pfarr | B23Q 1/621 | 83/578 |
| 5,904,867 A * | 5/1999 | Herke | B23K 26/04 | 219/121.6 |
| 5,906,760 A * | 5/1999 | Robb | B23K 26/142 | 219/121.84 |
| 5,922,225 A * | 7/1999 | Blake | B23K 26/10 | 219/121.84 |
| 6,037,015 A * | 3/2000 | dos Santo Simoes | B44C 5/06 | 125/1 |
| 6,064,034 A * | 5/2000 | Rieck | B23K 26/123 | 219/121.84 |
| 6,172,328 B1 * | 1/2001 | Jones | A24C 1/42 | 219/121.68 |
| 6,313,433 B1 * | 11/2001 | Sukman | B23K 26/064 | 219/121.76 |
| 6,347,891 B1 * | 2/2002 | Muckerheide | B41C 1/02 | 358/1.9 |
| 6,353,203 B1 * | 3/2002 | Hokodate | B23K 26/032 | 219/121.75 |
| 6,388,231 B1 * | 5/2002 | Andrews | B23K 26/40 | 219/121.61 |
| 6,424,670 B1 * | 7/2002 | Sukman | B23K 26/042 | 219/121.76 |
| 6,672,187 B2 * | 1/2004 | Alsten | B26D 5/005 | 83/365 |
| 6,772,661 B1 * | 8/2004 | Mikkelsen | B26D 7/27 | 83/75 |
| 6,822,192 B1 * | 11/2004 | Young | C04B 41/53 | 219/121.69 |
| 6,855,911 B1 * | 2/2005 | Lai | B23K 26/03 | 219/522 |
| 6,881,924 B2 * | 4/2005 | Lai | B23K 26/1462 | 219/121.68 |
| 6,908,243 B1 * | 6/2005 | Lai | B41J 11/706 | 400/621 |
| 6,984,803 B1 * | 1/2006 | Garnier | B23K 26/0853 | 219/121.72 |
| 7,204,884 B2 * | 4/2007 | Lunsford | B41M 5/38207 | 118/643 |
| 7,246,961 B2 * | 7/2007 | Gilmour | B41J 11/666 | 400/621 |
| 7,652,225 B2 * | 1/2010 | Fazeny | B23K 26/40 | 219/121.72 |
| 7,816,621 B2 * | 10/2010 | Weick | B23K 26/702 | 219/121.6 |
| 7,851,726 B2 * | 12/2010 | Fustinoni | B23K 26/10 | 74/89.22 |
| 7,875,828 B2 * | 1/2011 | Jung | B23K 26/0676 | 219/121.79 |
| 7,947,919 B2 * | 5/2011 | Sukhman | B23K 26/16 | 219/121.84 |
| 8,101,883 B2 * | 1/2012 | Sukhman | B23K 26/146 | 219/121.72 |
| 8,198,566 B2 * | 6/2012 | Baird | H10P 34/42 | 219/121.68 |
| 8,536,484 B2 * | 9/2013 | Lin | B23K 26/0876 | 219/121.68 |
| 8,544,911 B2 * | 10/2013 | Chen | B25B 11/007 | 414/737 |
| 9,156,056 B2 * | 10/2015 | Abe | B05C 11/028 | |
| 9,266,193 B2 * | 2/2016 | Liu | B23K 26/0665 | |
| 9,475,149 B1 * | 10/2016 | Testrake | B29D 11/00317 | |
| 9,492,892 B2 * | 11/2016 | Liu | B23K 26/032 | |
| 10,239,160 B2 * | 3/2019 | Mielke | C03B 33/0222 | |
| 10,376,992 B2 * | 8/2019 | Hildebrand | B23K 26/354 | |
| 10,486,267 B2 * | 11/2019 | Conseil | B23K 26/362 | |
| 10,654,127 B2 * | 5/2020 | Li | B23K 26/0876 | |
| 10,898,973 B2 * | 1/2021 | Lewicki | B23K 26/083 | |
| 11,446,761 B2 * | 9/2022 | Li | B23K 26/364 | |
| 2002/0002416 A1 * | 1/2002 | Herman Jr. | B26D 5/005 | 700/134 |
| 2002/0144578 A1 * | 10/2002 | Mikkelsen | B26F 1/3813 | 83/13 |
| 2003/0052105 A1 * | 3/2003 | Nagano | B29C 64/153 | 219/121.83 |
| 2003/0102293 A1 * | 6/2003 | Therond | B23K 26/064 | 219/121.78 |
| 2004/0040943 A1 * | 3/2004 | Lundberg | B23K 26/10 | 219/121.68 |
| 2005/0011874 A1 * | 1/2005 | Lai | B23K 26/142 | 219/121.82 |
| 2005/0115941 A1 * | 6/2005 | Sukhman | B23K 26/706 | 219/121.86 |
| 2005/0121428 A1 * | 6/2005 | Risser | B23K 26/0665 | 219/121.73 |
| 2005/0205537 A1 * | 9/2005 | Penz | B23K 26/702 | 219/121.72 |
| 2006/0081576 A1 * | 4/2006 | Lambert | B23K 26/702 | 219/121.84 |
| 2007/0034613 A1 * | 2/2007 | Lundberg | B23K 26/0876 | 219/121.68 |
| 2007/0035777 A1 * | 2/2007 | Kintner | B23K 26/0096 | 358/3.32 |
| 2007/0125756 A1 * | 6/2007 | Kelly | B23K 26/384 | 219/121.66 |
| 2008/0160254 A1 * | 7/2008 | Arnold | C04B 41/4576 | 428/141 |
| 2008/0185365 A1 * | 8/2008 | Yang | B23K 26/0876 | 219/121.6 |
| 2009/0057284 A1 * | 3/2009 | Fukuda | B23K 26/0604 | 219/121.72 |
| 2009/0212029 A1 * | 8/2009 | Ellis | B23K 26/14 | 219/121.68 |
| 2009/0223944 A1 * | 9/2009 | Sukhman | B33Y 30/00 | 219/121.84 |
| 2009/0314751 A1 * | 12/2009 | Manens | H10F 77/1692 | 219/121.68 |
| 2010/0044356 A1 * | 2/2010 | Cope | G01N 33/5097 | 219/121.67 |
| 2010/0108650 A1 * | 5/2010 | Huang | B23K 26/361 | 219/121.69 |
| 2010/0213180 A1 * | 8/2010 | Miller | B23K 37/0443 | 219/121.68 |
| 2011/0017716 A1 * | 1/2011 | Rumsby | H05K 3/0026 | 219/121.72 |
| 2011/0070386 A1 * | 3/2011 | Wazana | B23K 26/0823 | 219/121.67 |
| 2011/0108531 A1 * | 5/2011 | Stokes | B23K 26/40 | 219/121.68 |
| 2011/0174788 A1 * | 7/2011 | Chai | B23K 26/40 | 219/121.68 |
| 2011/0174789 A1 * | 7/2011 | Li | B44B 7/00 | 219/121.68 |
| 2013/0114114 A1 * | 5/2013 | Fazeny | B23K 26/0869 | 358/3.29 |
| 2013/0119027 A1 * | 5/2013 | Yerazunis | B23K 26/38 | 219/121.72 |

(56)         References Cited

U.S. PATENT DOCUMENTS

| | | | |
|---|---|---|---|
| 2013/0168373 A1* | 7/2013 | Lin | B23K 26/38 |
| | | | 219/121.82 |
| 2014/0014634 A1* | 1/2014 | Liu | B23K 26/362 |
| | | | 219/121.68 |
| 2014/0154088 A1* | 6/2014 | Etter | B23K 35/0261 |
| | | | 219/76.12 |
| 2014/0175067 A1* | 6/2014 | Reichenbach | B23K 26/361 |
| | | | 219/121.61 |
| 2014/0242400 A1* | 8/2014 | Hoebel | B22F 7/06 |
| | | | 219/121.17 |
| 2014/0263209 A1* | 9/2014 | Burris | B22F 12/43 |
| | | | 219/121.75 |
| 2015/0144607 A1* | 5/2015 | Gesuita | B23K 26/1462 |
| | | | 219/121.67 |
| 2015/0174699 A1* | 6/2015 | Bruck | B23K 26/359 |
| | | | 219/121.66 |
| 2015/0360323 A1* | 12/2015 | Fazeny | B26D 5/005 |
| | | | 219/121.72 |
| 2016/0001401 A1* | 1/2016 | Dimter | B22F 10/28 |
| | | | 219/76.12 |
| 2016/0059363 A1* | 3/2016 | Ardisson | B23K 26/032 |
| | | | 219/121.67 |
| 2016/0158888 A1* | 6/2016 | Liu | G02B 7/04 |
| | | | 359/809 |
| 2017/0057008 A1* | 3/2017 | Liu | G06T 7/0004 |
| 2017/0065840 A1* | 3/2017 | Shih | B23K 26/361 |
| 2019/0344384 A1* | 11/2019 | Zeygerman | B23K 26/0876 |
| 2020/0101566 A1* | 4/2020 | Markushov | B23K 26/044 |
| 2021/0121985 A1* | 4/2021 | Rubens | B23K 37/0538 |
| 2022/0143753 A1* | 5/2022 | Hofinger | B23K 26/355 |
| 2023/0271274 A1* | 8/2023 | Shih | B23K 26/364 |
| | | | 219/121.68 |

* cited by examiner

AUTOMATIC MODULE SWITCHING SYSTEM OF A COMBINED PROCESSING APPARATUS

BACKGROUND OF THE INVENTION

1. Field of the Invention

The present invention relates to a combined processing apparatus, especially to an automatic module switching system of a combined processing apparatus.

2. Description of the Prior Art(s)

With the progress of processing and manufacturing techniques of industrial products, output devices, such as printers, laser cutting or engraving machines, of a computer have gradually developed from the large-size equipment into desktop equipment with small size, low power consumption and relatively cheap price.

Take the laser cutting machine for instance, for different materials such as wood, acrylic or leather, cutting speed and power required for the processing process are also different. However, since there is only one laser cutting module installed in a conventional laser cutting machine, the conventional laser cutting machine cannot be used in different processing conditions. Consequently, a user has to prepare more than two laser cutting machines of different types, which is costly and takes up much room, according to his/her needs.

To overcome the shortcomings, the present invention provides an automatic module switching system of a combined processing apparatus to mitigate or obviate the aforementioned problems.

SUMMARY OF THE INVENTION

The main objective of the present invention is to provide an automatic module switching system of a combined processing apparatus. The automatic module switching system includes a chassis, a moving mechanism, a holding device, and multiple processing modules.

The chassis has two sidewalls oppositely defined on the chassis, a hanging wall extending between the two sidewalls, and multiple positioning sets disposed on the hanging wall. Each of the positioning sets includes at least one first positioning magnetic element and at least one positioning hole. Each of the at least one positioning hole is elongated and has a misaligning end and a positioning end.

The moving mechanism is mounted in the chassis.

The holding device is mounted on the moving mechanism. The moving mechanism is driven to drive the holding device to move along a first moving direction and the holding device is driven to move along a second moving direction on the moving mechanism. The holding device includes a fixed bracket connected with the moving mechanism and driven to move along the second moving direction and a moving seat mounted to the fixed bracket and being movable along a third moving direction relative to the fixed bracket. The moving seat has a moving holding surface facing toward the hanging wall of the chassis, and an aligning protrusion and at least one first aligning magnetic element disposed on the moving holding surface.

The processing modules are detachably mounted onto the positioning sets of the hanging wall of the chassis and the holding device. Each of the processing module having a hanging surface facing toward the hanging wall of the chassis and provided with at least one second positioning magnetic element and at least one positioning protrusion and a held surface facing toward the moving mechanism and provided with an aligning recess and at least one second aligning magnetic element. A positional arrangement of the at least one second positioning magnetic element and the at least one positioning protrusion on the hanging surface corresponds to a positional arrangement of the at least one first positioning magnetic element and the positioning end of the at least one positioning hole of each of the positioning sets on the hanging wall. A positional arrangement of the aligning end of the aligning recess and the at least one second aligning magnetic element on the held surface corresponds to a positional arrangement of the at least one first aligning magnetic element and the aligning protrusion on the moving holding surface of the moving seat.

With the automatic module switching system, the combined processing apparatus can be scheduled to switch the processing modules automatically according user's needs, such that the combined processing apparatus can process in a manner that meets the user's needs. The user does not have to prepare a plurality of processing machines with different functions. Therefore, cost for purchasing the plurality of processing machines can be saved and the problem of occupying much room can be also avoided.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
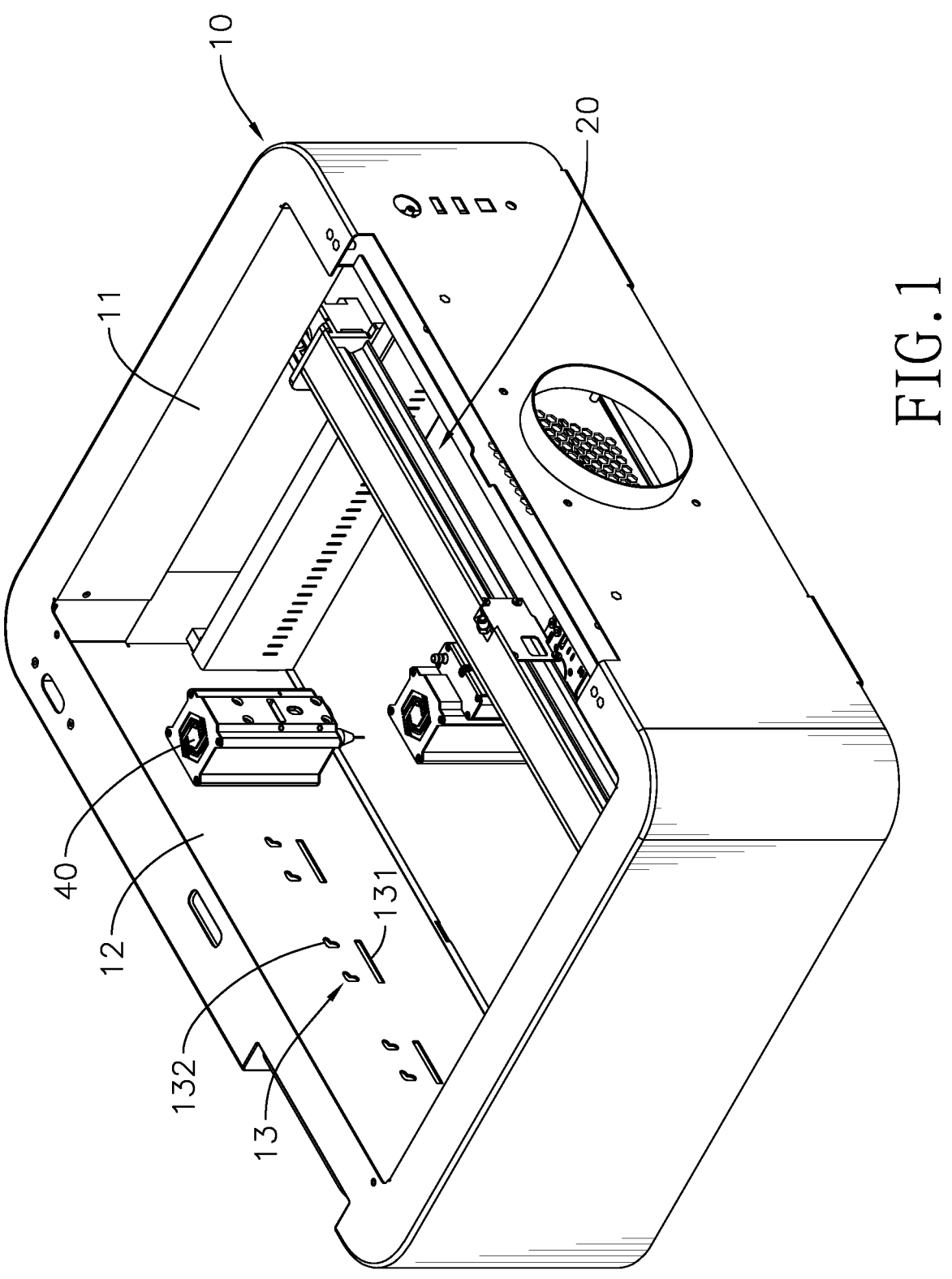
FIG. 1 is a rear perspective view of an automatic module switching system of a combined processing apparatus in accordance with the present invention.
Figure 2:
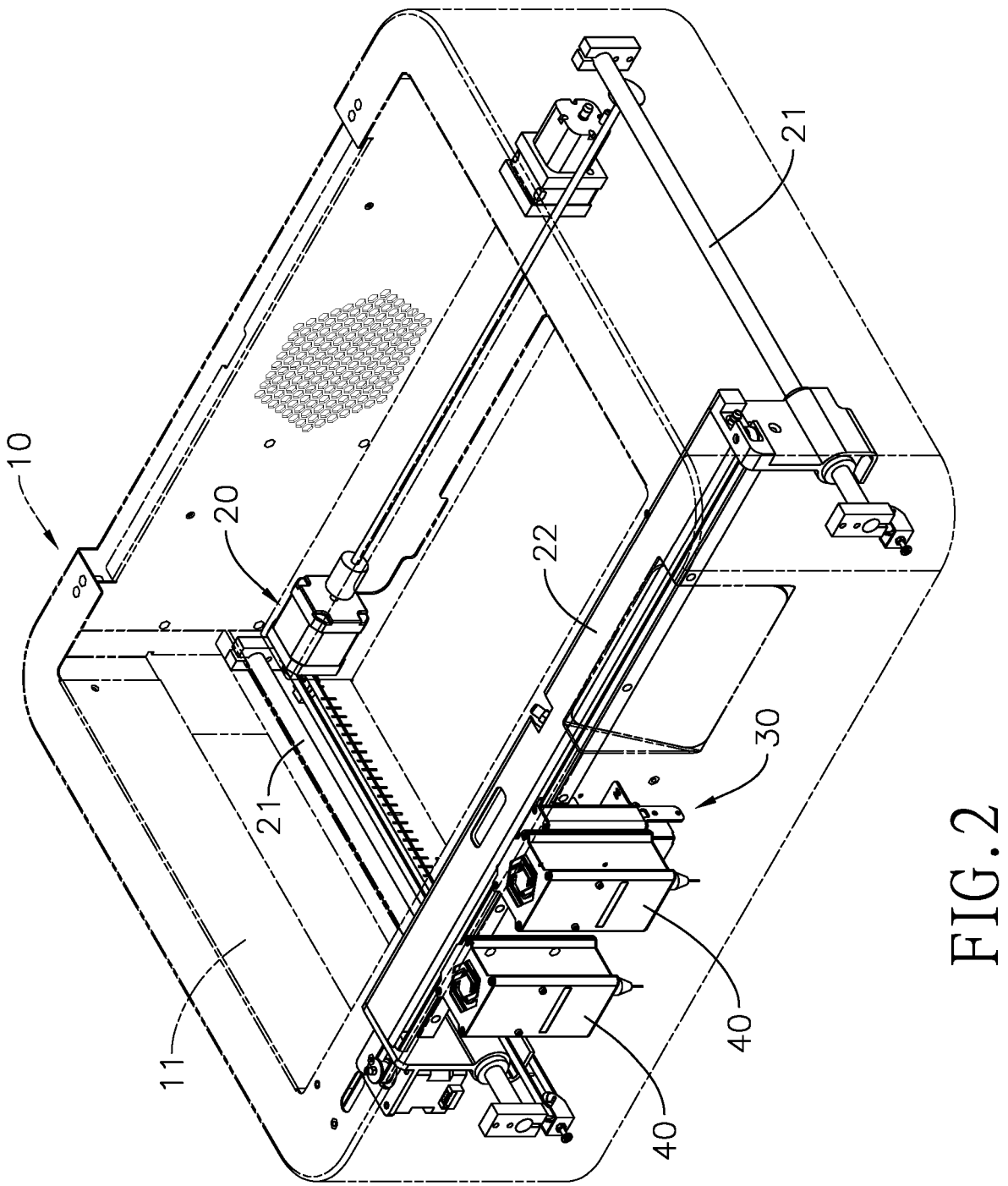
FIGS. 2 and 3 are operational front perspective views of the automatic module switching system in FIG. 1.
Figure 3:
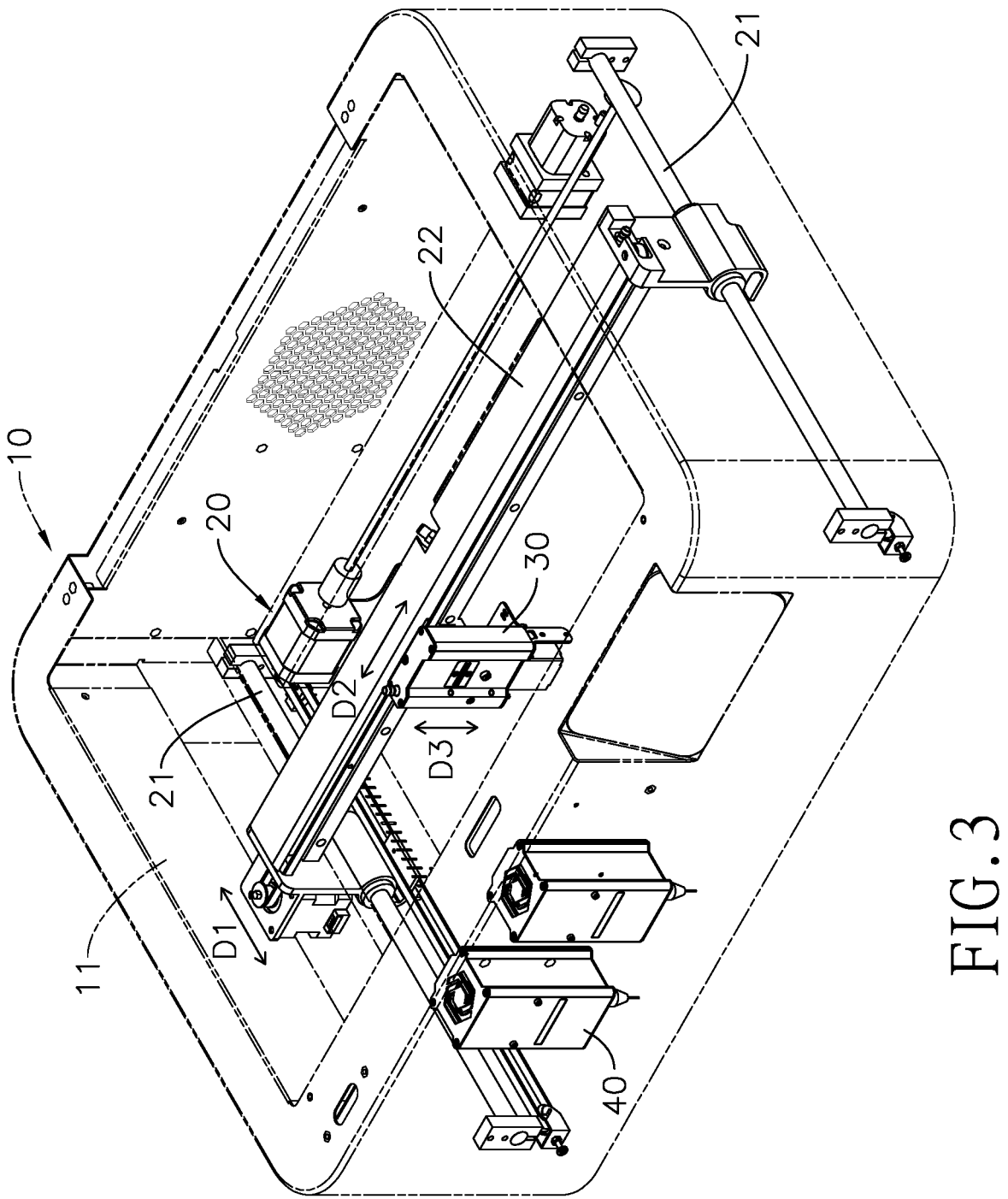

With reference to FIGS. 1 and 2, an automatic module switching system of a combined processing apparatus in accordance with the present invention comprises a chassis 10, a moving mechanism 20, a holding device 30, and multiple processing modules 40.

Figure 4:
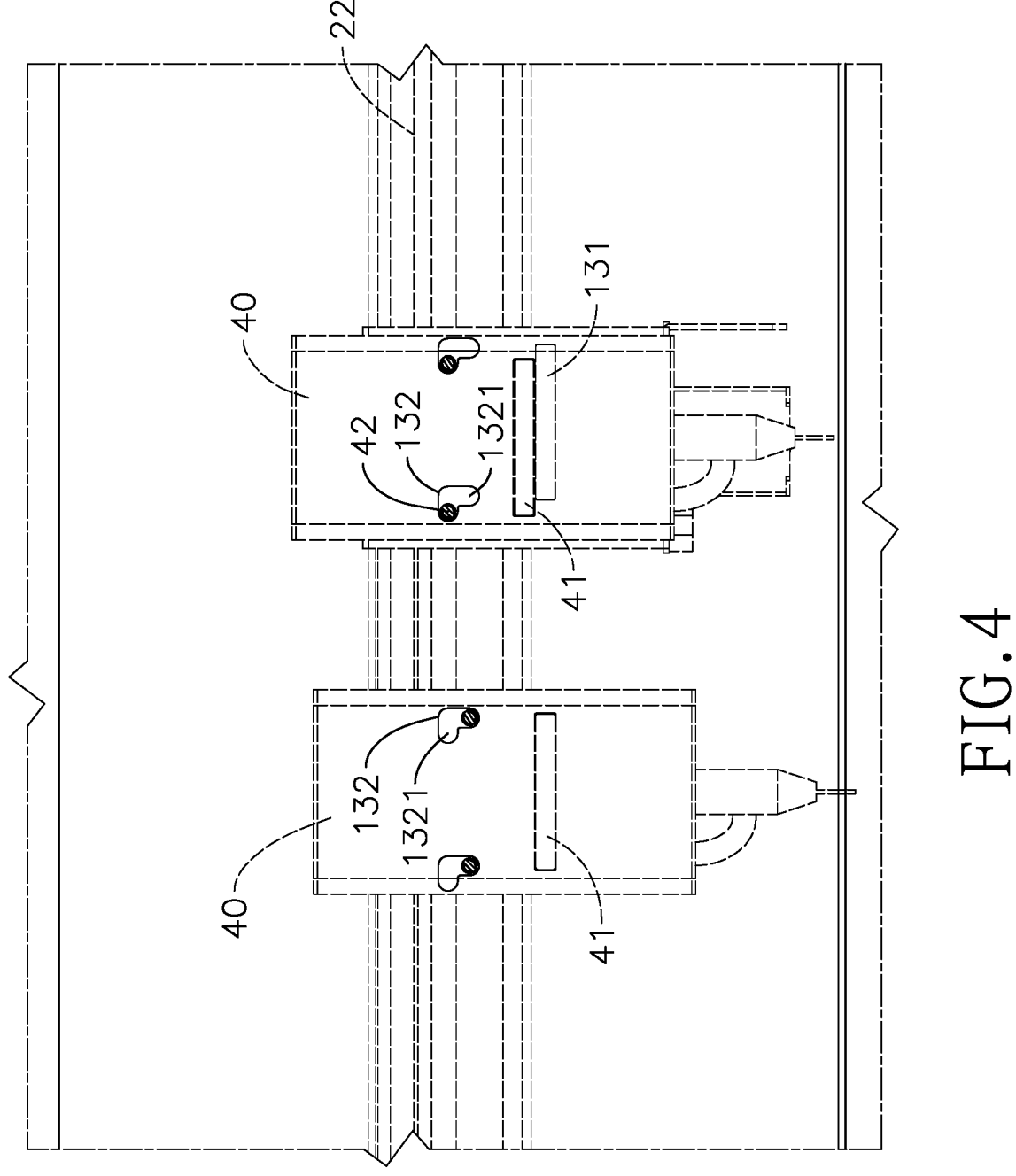
FIGS. 4 and 5 are enlarged operational front views of the automatic module switching system in FIG. 1.

With further reference to FIG. 4, the chassis 10 has two sidewalls 11, a hanging wall 12, and multiple positioning sets 13. The two sidewalls 11 are oppositely defined on the chassis 10. The hanging wall 12 extends between the two sidewalls 11. The positioning sets 13 are disposed on the hanging wall 12 and are separately arranged between the two sidewalls 11. Each of the positioning sets 13 includes at least one first positioning magnetic element 131 and at least one positioning hole 132. Each of the at least one positioning hole is elongated and has a misaligning end 1321 and a positioning end 1322. In the preferred embodiment, each of the at least one positioning hole 132 is L-shaped.

The moving mechanism 20 is mounted in the chassis 10 and includes two guiding rods 21 and a moving rod 22. The two guiding rods 21 are mounted adjacent to the two sidewalls 11 respectively. Each of the guiding rods 21 extends along a first moving direction D1 and has two ends. One of the two ends of the guiding rod 21 extends toward the hanging wall 12 and the other end of the guiding rod 21 extends away from the hanging wall 12. The moving rod 22 extends along a second moving direction D2 and has two ends. The two ends of the moving rod 22 are mounted to the two guiding rods 21 respectively. The moving rod 22 is driven to move along the guiding rods 21, so as to move toward or away from the hanging wall 12.

Figure 6:
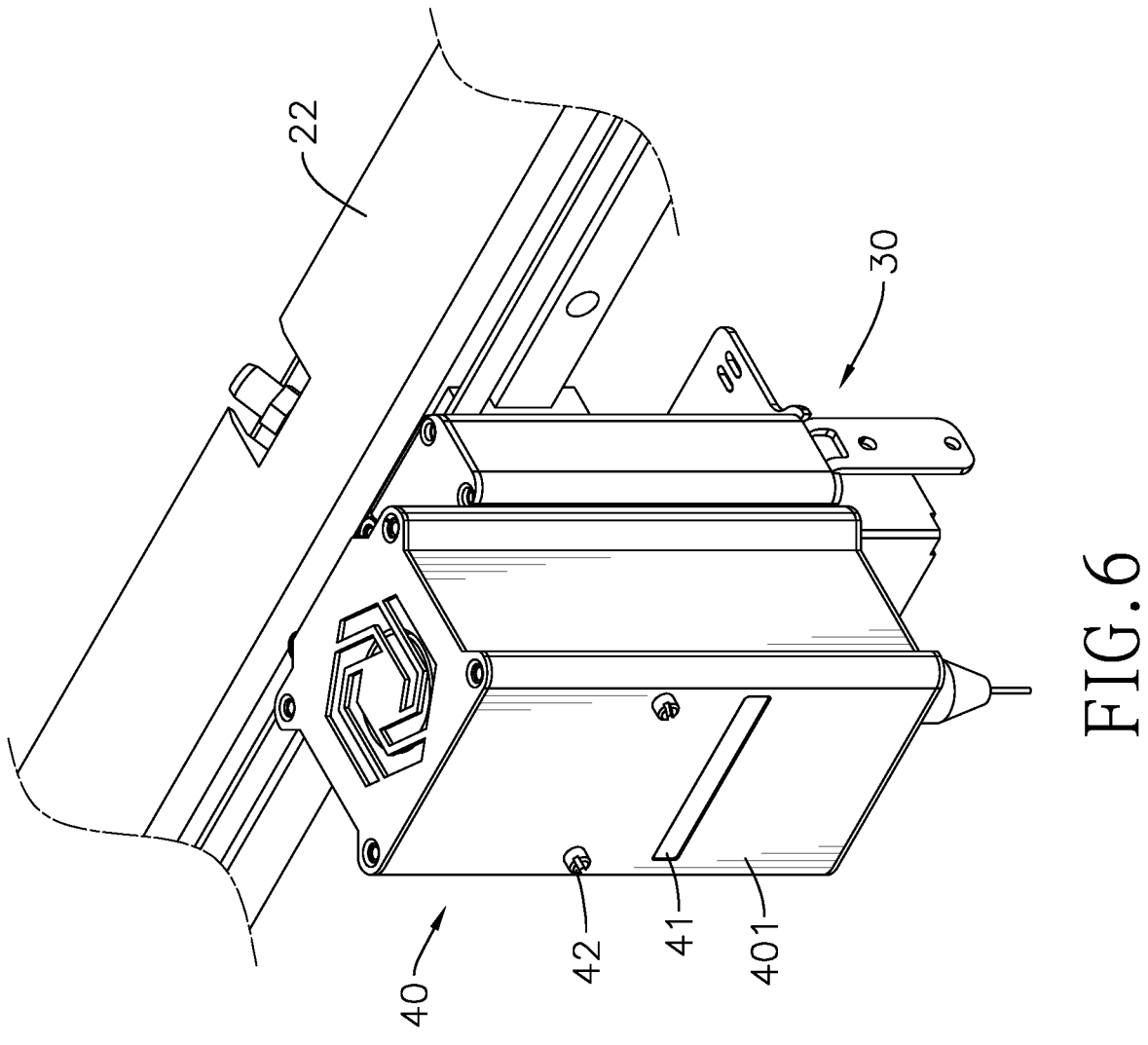
FIG. 6 is an enlarged perspective view of a moving mechanism, a holding device and a processing module of the automatic module switching system in FIG. 1.
Figure 7:
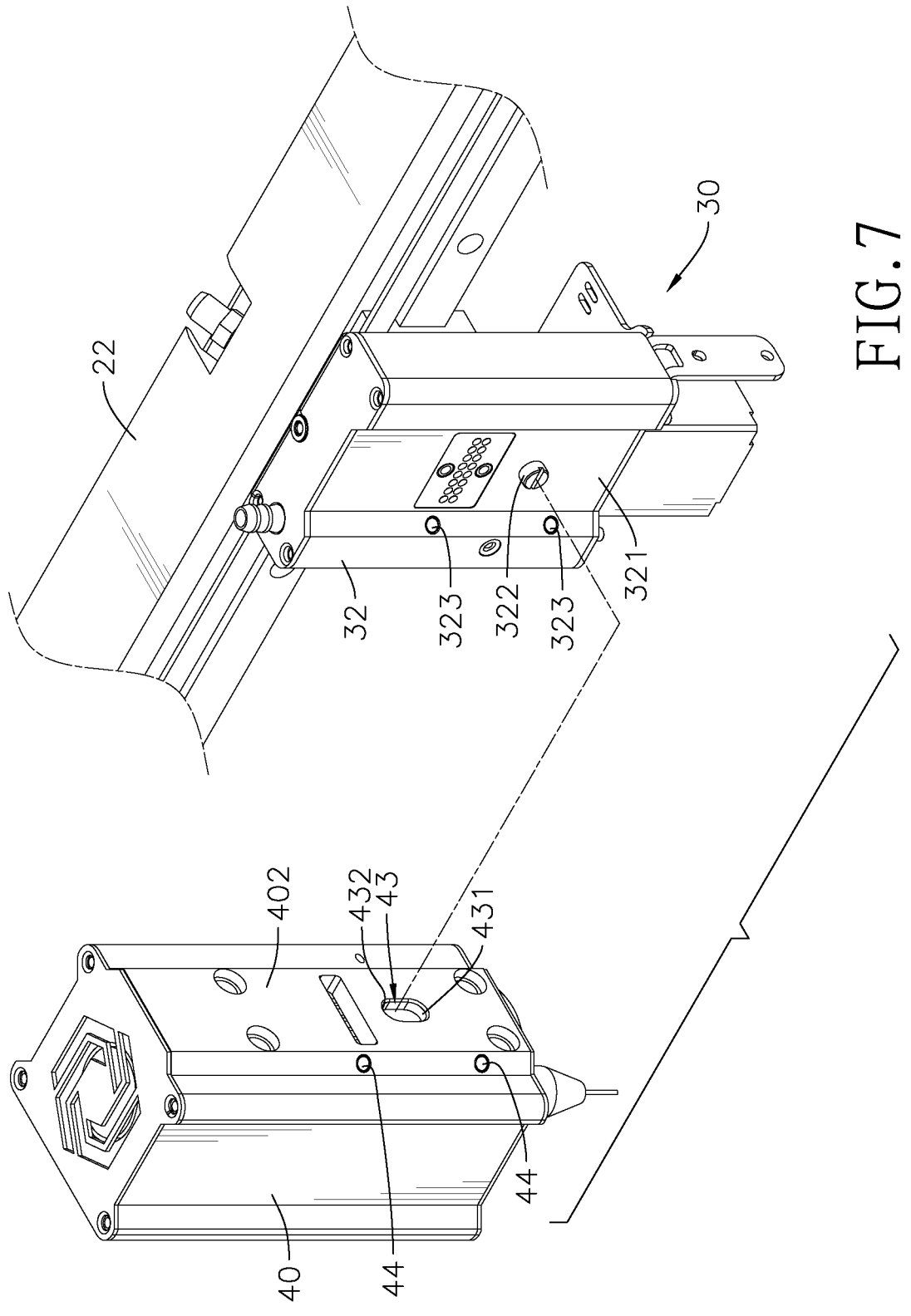
FIG. 7 is an enlarged exploded perspective view of the moving mechanism, the holding device and the processing module of the automatic module switching system in FIG. 6.
Figure 8:
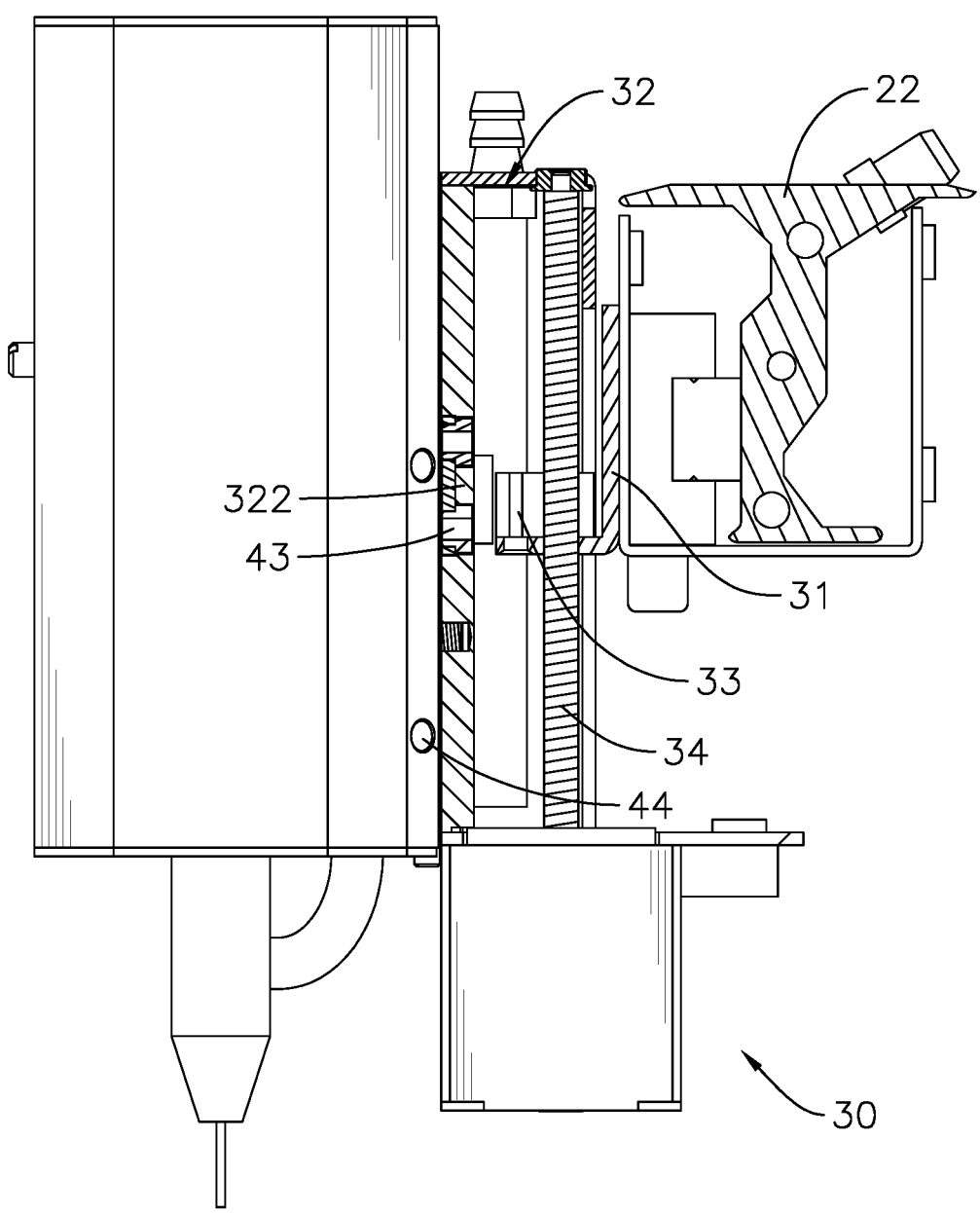
FIG. 8 is a side view in partial section of the moving mechanism, the holding device and the processing module of the automatic module switching system in FIG. 6.

With further reference to FIGS. 6 to 8, the holding device 30 is mounted on the moving mechanism 20 and is configured to hold one of the processing modules 40. The moving mechanism 20 is configured to be driven to drive the holding device 30 to move along the first moving direction D1. The holding device 30 is configured to be driven to move along the second moving direction D2 on the moving mechanism 20. The holding device 30 includes a fixed bracket 31 and a moving seat 32. The fixed bracket 31 is connected with the moving rod 22 of the moving mechanism 20 and is driven to move along the moving rod 22, such that the fixed bracket 31 moves along the second moving direction D2.

As shown in FIG. 7, the moving seat 32 is mounted to the fixed bracket and is movable along a third moving direction D3 relative to the fixed bracket 31. The moving seat 32 has a moving holding surface 321, an aligning protrusion 322, and at least one first aligning magnetic element 323. The moving holding surface 321 faces toward the hanging wall 12 of the chassis 10. The aligning protrusion 322 and the at least one first aligning magnetic element are disposed on the moving holding surface 321. In the preferred embodiment, the first moving direction D1, the second moving direction D2 and the third moving direction D3 are perpendicular to each other.

As shown in FIG. 8, specifically, the fixed bracket 31 and the moving seat 32 are connected with each other through a nut 33 and a bolt 34. The nut 33 and the bolt 34 are mounted on the fixed bracket 31 and the moving seat 32 respectively. The bolt 34 is able to be driven to rotate. The nut 33 is mounted on the bolt 34 and meshes with the bolt 34 through threads. When the bolt 34 is driven to rotate, the nut 33 and the bolt 34 move relative to each other along an elongation direction of the bolt 34. Accordingly, the moving seat 32 and the fixed bracket 31 also move relative to each other.

In the preferred embodiment, the nut 33 is securely mounted to the fixed bracket 31 and the bolt 34 is rotatably mounted in the moving seat 32. When the bolt 34 is driven to rotate by a motor 35, the bolt 34 and the moving seat 32 move relative to the fixed bracket 31 along the third moving direction D3. However, it is not limited thereto. The nut 33 may be securely mounted in the moving seat 32 and the bolt 34 may be rotatably mounted to the fixed bracket 31. In this way, the moving seat 32 is also able to be driven to move relative to the fixed bracket 31 along the third moving direction D3.

With reference to FIGS. 1 to 3 and 6 to 7, the processing modules 40 are detachably mounted onto the positioning sets 13 of the hanging wall 12 of the chassis 10 and the holding device 30. Each of the processing module 40 has a hanging surface 401 and a held surface 402.

Figure 5:
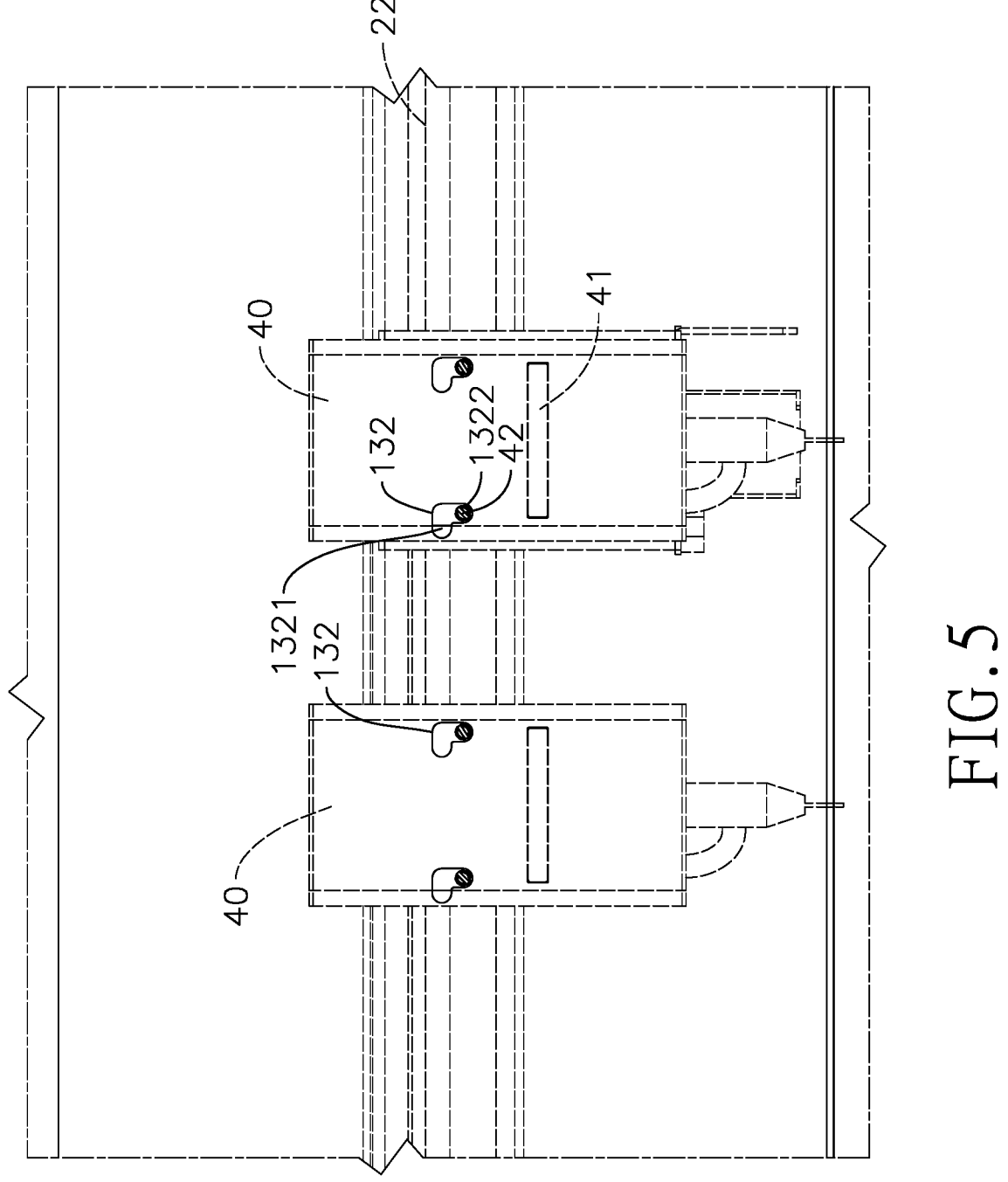

With further reference to FIGS. 4 to 6, the hanging surface 401 faces toward the hanging wall 12 of the chassis 10 and is provided with at least one second positioning magnetic element 41 and at least one positioning protrusion 42. A positional arrangement of the at least one second positioning magnetic element 41 and the at least one positioning protrusion 42 on the hanging surface 401 corresponds to a positional arrangement of the at least one first positioning magnetic element 131 and the positioning end 1322 of the at least one positioning hole 132 of each of the positioning sets 13 on the hanging wall 12.

Thus, when the at least one positioning protrusion 42 of each of the processing module 40 protrudes into and is disposed at the misaligning end of the at least one positioning hole 132 of a corresponding one of the positioning sets 13, the at least one second positioning magnetic element 41 and the at least one first positioning magnetic element 131 are offset, such that the moving mechanism 20 is able to drive the holding device 30 and the processing module 40 to move away from the hanging wall 12 of the chassis 10 by moving along the first moving direction D1.

When the at least one positioning protrusion 42 of each of the processing module 40 is moved to the positioning end 1322 of the at least one positioning hole 132 of the corresponding one of the positioning sets 13, the at least one second positioning magnetic element 41 corresponds in position to and is attracted by the at least one first positioning magnetic element 131. Accordingly, the processing module 40 is securely mounted to the hanging wall 12 of the chassis 10.

As shown in FIGS. 7 and 8, the held surface 402 faces toward the moving mechanism 20 and is provided with an aligning recess 43 and at least one second aligning magnetic element 44. The aligning recess 43 is elongated and has a misaligning end 431 and an aligning end 432. A positional arrangement of the aligning end 432 of the aligning recess 43 and the at least one second aligning magnetic element 44 on the held surface 402 corresponds to a positional arrangement of the at least one first aligning magnetic element 323 and the aligning protrusion 322 on the moving holding surface 321 of the moving seat 32. In the preferred embodiment, the aligning recess 43 extends linearly.

Thus, when the aligning protrusion 322 of the moving seat 32 protrudes into and is disposed at the misaligning end 431 of the aligning recess 43 of the processing module 40, the at least one second aligning magnetic element 44 and the at least one first aligning magnetic element 323 are offset, such that the moving mechanism 20 is able to drive the holding device 30 to move away from the processing module 40 and the hanging wall 12 of the chassis 10 by moving along the first moving direction D1.

When the aligning protrusion 322 of the moving seat 32 is moved to the aligning end 432 of the aligning recess 43 of the processing module 40, the at least one second aligning magnetic element 44 corresponds in position to and is attracted by the at least one first aligning magnetic element 323. Accordingly, the processing module 40 is securely mounted to the moving seat 32 of the holding device 30.

Each of the above-mentioned processing modules 40 may be a laser cutting module, a 2-dimensional printing module, a 3-dimensional printing module, a computer numerical control (CNC) engraving module, or the like. In one combined processing apparatus having the automatic module switching system in accordance with the present invention, the processing modules 40 may be of the same function but with different types, or may be with different functions.

With the above-mentioned automatic module switching system, when switching the processing module 40 on the holding device 30, the processing module 40 on the holding device 30 is hung onto the corresponding one of the positioning sets 13 on the hanging wall 12 of the chassis 10 first, and then the holding device 30 is moved to another one of the processing modules 40 to detach said processing module 40.

When hanging the processing module 40 on the holding device 30 back onto the hanging wall 12 of the chassis 10, the holding device 30 and the processing module 40 thereon are driven by the moving mechanism 20 to move toward the hanging wall 12 of the chassis 10 along the first moving direction D1 first and then to move to correspond in position to the corresponding one of the positioning sets 13 along the second moving direction D2. Thus, the at least one positioning protrusion 42 of the processing module 40 protrudes into the misaligning end 1321 of the at least one positioning hole 132 of the corresponding one of the positioning sets 13.

Afterwards, the holding device 30 and the processing module 40 thereon are driven to move along the second moving direction D2, and the holding device 30 drives the moving seat 32 and said processing module 40 to move along the third moving direction D3. By moving the at least one positioning protrusion 42 of the processing module 40 to the positioning end 1322 of the at least one positioning hole 132 of the corresponding one of the positioning sets 13, the at least one second positioning magnetic element 41 of the processing module 40 is attracted by the at least one first positioning magnetic element 131 of the corresponding one of the positioning sets 13.

Meanwhile, since the processing module 40 has been securely mounted on the hanging wall 12 of the chassis 10 through the at least one positioning protrusion 42, the at least one positioning hole 132 of the corresponding one of the positioning sets 13, the at least one second positioning magnetic element 41 and the at least one first positioning magnetic element 131, the holding device is able to drive the moving seat 32 to move relative to the processing module 40 along the third moving direction D3. By moving the aligning protrusion 322 of the moving seat 32 from the aligning end 432 to the misaligning end 431 of the aligning recess 43 of the processing module 40, the at least one second aligning magnetic element 44 and the at least one first aligning magnetic element 323 are offset, such that the moving mechanism 20 is able to drive the holding device 30 to move away from the processing module 40 and the hanging wall 12 of the chassis 10 by moving along the first moving direction D1. Accordingly, the processing module 40 is detached from the holding device 30.

On the contrary, when detaching another one of the processing module 40 on the hanging wall 12 of the chassis 10, the moving mechanism 20 together with the holding device 30 drives the moving seat 32 to make the aligning protrusion 322 to protrude into the aligning end 432 of the aligning recess 43 of the processing module 40, and to allow the at least one second aligning magnetic element 44 and the at least one first aligning magnetic element 323 to attract each other. Accordingly, the processing module 40 is securely mounted to the moving seat 32 of the holding device 30.

By further driving the processing module 40 with the moving mechanism 20 and the holding device 30 through the moving seat 32, the at least one positioning protrusion 42 of the processing module 40 is moved from the aligning end 1322 to the misaligning end 1321 of a corresponding one of the at least one positioning hole 132, such that the at least one one second aligning magnetic element 44 and the at least one first aligning magnetic element 323 are offset. Thus, the moving mechanism 20 is able to further drive the holding device 30 and the processing module 40 thereon to move away from the hanging wall 12 of the chassis 10 along the first moving direction D1. Accordingly, the processing module 40 is detached from the hanging wall 12.

The above-mentioned automatic module switching system has the following advantages. The combined processing apparatus can be scheduled to switch the processing modules 40 automatically according user's needs, such that the combined processing apparatus can process in a manner that meets the user's needs. The user does not have to prepare a plurality of processing machines with different functions. Therefore, cost for purchasing the plurality of processing machines can be saved and the problem of occupying much room can be also avoided.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automatic module switching system of a combined processing apparatus, and the automatic module switching system comprising:

a chassis having two sidewalls oppositely defined on the chassis;

a hanging wall extending between the two sidewalls; and multiple positioning sets disposed on the hanging wall, and each of the positioning sets including at least one first positioning magnetic element; and at least one positioning hole, and each of the at least one positioning hole being elongated and having a misaligning end and a positioning end;

a moving mechanism mounted in the chassis;

a holding device mounted on the moving mechanism, the moving mechanism driven to drive the holding device to move along a first moving direction, the holding device driven to move along a second moving direction on the moving mechanism, and the holding device including a fixed bracket connected with the moving mechanism and driven to move along the second moving direction; and a moving seat mounted to the fixed bracket and being movable along a third moving direction relative to the fixed bracket, and the moving seat having a moving holding surface facing toward the hanging wall of the chassis; and an aligning protrusion and at least one first aligning magnetic element disposed on the moving holding surface; and multiple processing modules detachably mounted onto the positioning sets of the hanging wall of the chassis and the holding device, and each of the processing module having a hanging surface facing toward the hanging wall of the chassis and provided with at least one second positioning magnetic element and at least one positioning protrusion, wherein a positional arrangement of the at least one second positioning magnetic element and the at least one positioning protrusion on the hanging surface corresponds to a positional arrangement of the at least one first positioning magnetic element and the positioning end of the at least one positioning hole of each of the positioning sets on the hanging wall; and a held surface facing toward the moving mechanism and provided with an aligning recess and at least one second aligning magnetic element, wherein a positional arrangement of the aligning end of the aligning recess and the at least one second aligning magnetic element on the held surface corresponds to a positional arrangement of the at least one first aligning magnetic element and the aligning protrusion on the moving holding surface of the moving seat.

2. The automatic module switching system as claimed in claim 1, wherein the moving mechanism including two guiding rods, and each of the guiding rods extending along the first moving direction; and a moving rod extending along the second moving direction and having two ends mounted to the two guiding rods respectively, and the moving rod driven to move along the guiding rods; and the fixed bracket of the holding device is connected with the moving rod of the moving mechanism.

3. The automatic module switching system as claimed in claim 1, wherein the fixed bracket and the moving seat are connected with each other through a nut and a bolt, the nut and the bolt are mounted on the fixed bracket and the moving seat respectively, the bolt is driven to rotate, and the nut is mounted on the bolt and meshes with the bolt through threads.

4. The automatic module switching system as claimed in claim 2, wherein the fixed bracket and the moving seat are connected with each other through a nut and a bolt, the nut and the bolt are mounted on the fixed bracket and the moving seat respectively, the bolt is driven to rotate, and the nut is mounted on the bolt and meshes with the bolt through threads.

5. The automatic module switching system as claimed in claim 3, wherein the nut is securely mounted to the fixed bracket and the bolt is rotatably mounted in the moving seat.

6. The automatic module switching system as claimed in claim 4, wherein the nut is securely mounted to the fixed bracket and the bolt is rotatably mounted in the moving seat.

7. The automatic module switching system as claimed in claim 1, wherein the first moving direction, the second moving direction and the third moving direction are perpendicular to each other.

8. The automatic module switching system as claimed in claim 2, wherein the first moving direction, the second moving direction and the third moving direction are perpendicular to each other.

9. The automatic module switching system as claimed in claim 3, wherein the first moving direction, the second moving direction and the third moving direction are perpendicular to each other.

10. The automatic module switching system as claimed in claim 4, wherein the first moving direction, the second moving direction and the third moving direction are perpendicular to each other.

* * * * *